US010723545B2

(12) United States Patent
Kornelsen et al.

(10) Patent No.: US 10,723,545 B2
(45) Date of Patent: Jul. 28, 2020

(54) SPECIALIZED CONTAINER FOR THE STORING OF GRANULATED RAW MATERIALS AND OPERATIONS SUPPORT BASE (71) Applicants: Eddy Kornelsen, Cuauhtemoc (MX); Jose Eliseo Meraz, Jr., Avondale, AZ (US)

(72) Inventors: Eddy Kornelsen, Cuauhtemoc (MX); Jose Eliseo Meraz, Jr., Avondale, AZ (US)

( * ) Notice: Subject to any disclaimer, the term of this patent is extended or adjusted under 35 U.S.C. 154(b) by 23 days.

(21) Appl. No.: 16/038,745

(22) Filed: Jul. 18, 2018

(65) Prior Publication Data
US 2019/0119038 A1  Apr. 25, 2019

(30) Foreign Application Priority Data
Oct. 20, 2017 (MX) .................. MX/U/2017/000455

(51) Int. Cl.
*B65D 88/32* (2006.01)
*B65D 88/02* (2006.01)
(Continued)

(52) U.S. Cl.
CPC ......... *B65D 88/027* (2013.01); *B65D 88/126* (2013.01); *B65D 88/30* (2013.01); *B65D 88/32* (2013.01); *B65D 90/00* (2013.01); *B65D 90/023* (2013.01); *B65D 90/18* (2013.01); *B65D 90/48* (2013.01); *B65D 90/587* (2013.01); *B65D 90/66* (2013.01); *B65G 11/026* (2013.01); *B65G 11/146* (2013.01); *B65G 11/186* (2013.01); *B65D 88/26* (2013.01)

(58) Field of Classification Search
CPC ...... B65D 88/027; B65D 88/30; B65D 88/32; B65D 90/12; B65D 90/125
See application file for complete search history.

(56) References Cited

U.S. PATENT DOCUMENTS 2,519,929 A   8/1950  Redler
2,620,226 A  12/1952  Jones
(Continued)

FOREIGN PATENT DOCUMENTS

CA    2820204      * 12/2014  ............. B65G 47/52
CN  110578537 A    12/2019

OTHER PUBLICATIONS

Dwyer Model PLS2 Paddle Level Switch brochure, 2014 from file:///a/Users/nnhagennan/Desktop/DWYER%20L_PLS2_rev2%20NPL.pdf (Year: 2014).*

*Primary Examiner* — Mark C Hageman
(74) *Attorney, Agent, or Firm* — Clayton, McKay & Bailey, PC (57) ABSTRACT The present invention corresponds to materials storage devices; specifically to a specialized container for the storing of granulated raw materials and its operations support base; which has been created in response to the need of storing granulated raw materials, preferably silica meant to be used in, preferably but not limited to, petroleum wells; and which is fitted with specific modifications that facilitate both the loading and discharge of said raw materials in a shorter time lapse than that displayed by conventional technologies. The invention's preferred configuration contemplates the setting up of three containers on top of the operations support base.

15 Claims, 10 Drawing Sheets (51) Int. Cl.
*B65D 88/12* (2006.01)
*B65D 90/02* (2019.01)
*B65G 11/02* (2006.01)
*B65G 11/14* (2006.01)
*B65G 11/18* (2006.01)
*B65D 90/18* (2006.01)
*B65D 90/48* (2006.01)
*B65D 90/58* (2006.01)
*B65D 90/00* (2006.01)
*B65D 88/30* (2006.01)
*B65D 90/66* (2006.01)
*B65D 88/26* (2006.01)

(56) References Cited

U.S. PATENT DOCUMENTS

| | | |
|---|---|---|
| 2,880,849 A | 4/1959 | Craggs |
| 3,310,345 A | 3/1967 | Rowden |
| 3,361,478 A | 1/1968 | Ross, Jr. |
| 3,402,805 A | 9/1968 | Spellman |
| 3,595,175 A | 7/1971 | Austill |
| 3,613,866 A | 10/1971 | Arndt |
| 3,692,363 A | 9/1972 | Tenebaum |
| 3,788,452 A | 1/1974 | McWilliams |
| 3,826,353 A | 7/1974 | Greasley |
| 3,938,861 A | 2/1976 | Bagwell |
| 3,945,484 A | 3/1976 | Oury |
| 4,009,906 A | 3/1977 | Sweet |
| 4,058,198 A | 11/1977 | O'Neill |
| 4,342,267 A | 8/1982 | Blout |
| 4,348,047 A | 9/1982 | Harshman |
| 4,475,672 A | 10/1984 | Whitehead |
| 4,505,512 A | 3/1985 | Schmeichel |
| 4,523,669 A | 6/1985 | Smith |
| 4,691,957 A | 9/1987 | Ellingson |
| 4,747,244 A | 5/1988 | Christianson |
| 4,813,839 A | 3/1989 | Compton |
| 5,046,432 A | 9/1991 | Bowler |
| 5,203,442 A | 4/1993 | Oury |
| 5,326,156 A | 7/1994 | Heider |
| 5,465,830 A | 11/1995 | Tingskog |
| 5,498,119 A | 3/1996 | Faivre |
| 5,669,562 A | 9/1997 | Smith |
| 5,782,524 A | 7/1998 | Heider |
| 6,059,372 A | 5/2000 | McDonald |
| 6,135,534 A | 10/2000 | Schmeichel |
| 6,283,269 B1 | 9/2001 | Mayer |
| 6,378,686 B1 | 4/2002 | Mayer |
| 6,401,983 B1 | 6/2002 | McDonald |
| 6,749,268 B1 | 6/2004 | Wheeler |
| 6,929,113 B1 | 8/2005 | Hoover |
| 8,025,140 B2 | 9/2011 | Whyte |
| 8,132,659 B2 | 3/2012 | Coers |
| 8,944,740 B2 * | 2/2015 | Teichrob ............ B65G 63/008 414/268 |
| 9,315,294 B2 * | 4/2016 | Herman .............. B60P 1/6427 |
| 9,428,348 B2 * | 8/2016 | Teichrob ............ B65G 63/008 |
| 9,688,469 B2 * | 6/2017 | Sheesley ............ B65D 88/30 |
| 9,758,082 B2 * | 9/2017 | Eiden, III ............ B65G 65/42 |
| 10,059,245 B2 | 8/2018 | Goedken |
| 10,351,043 B1 | 7/2019 | Kibler |
| 2002/0121532 A1 | 9/2002 | Kassian |
| 2004/0031662 A1 | 2/2004 | Dekoning |
| 2004/0060798 A1 | 4/2004 | Grundl |
| 2004/0178233 A1 | 9/2004 | Medemblik |
| 2005/0168047 A1 | 8/2005 | Grier |
| 2009/0071797 A1 | 3/2009 | Frankl |
| 2009/0078410 A1 * | 3/2009 | Krenek ................ E21B 43/267 166/244.1 |
| 2009/0085394 A1 | 4/2009 | Lemmons |
| 2010/0270848 A1 | 10/2010 | Heider |
| 2011/0253503 A1 | 10/2011 | MacKin |
| 2012/0048674 A1 | 3/2012 | Smith |
| 2015/0353291 A1 | 12/2015 | Teichrob |
| 2016/0130095 A1 * | 5/2016 | Oren .................... B65G 65/40 414/414 |
| 2019/0225429 A1 | 7/2019 | McCloskey |

\* cited by examiner

SPECIALIZED CONTAINER FOR THE STORING OF GRANULATED RAW MATERIALS AND OPERATIONS SUPPORT BASE

This application claims priority to Mexican Patent Application No. MX/U/2017/000455, filed Oct. 20, 2017, which is expressly incorporated by reference herein.

PURPOSE OF THE INVENTION

The present invention corresponds to materials storage devices; specifically to a specialized container for the storing of granulated raw materials and its operations support base; which has been created in response to the need of storing granulated raw materials, preferably silica meant to be used in, preferably but not limited to, petroleum wells; and which is fitted with specific modifications that facilitate both the loading and discharge of said raw materials in a shorter time lapse than that displayed by conventional technologies.

BACKGROUND

There is knowledge about similar technologies, which nonetheless present notorious differences both in form and function to the present invention. By way of example, we can mention the cases of the containers manufactured by US companies Propell and Solaris. In the case of the Propell's products, their containers require a 70 degree tilt relative to the ground when being set up; the present invention saves up on space by being able to be set up in a straight angle. Competing containers have a cylindrical shape and a loading method that consists of the opening of their hatches to receive the raw materials of interest, which is pressure-fed to said containers, thus generating dust upon contact with the containers. The present invention carries out its functions in a vertical position, however, unlike existing technologies, which are loaded onto a platform for their hauling and transportation, the present container is fitted with a wheel axle in its posterior end and a king pin towards the other end that can be coupled to a truck's fifth wheel, thus doing away with the need for an accessory means of transportation. One of the differentiating characteristics of our equipment relative to those that already exist on the market is the airtight connection achieved between the container and an associated conveyor belt; this quality impedes the entrance of air during the storage process in which the container if loaded with the raw materials, which prevents the generation of dust, thus reducing material loss and mainly safeguarding said equipment's operator's health.

DETAILED DESCRIPTION OF THE INVENTION

Figure 1:
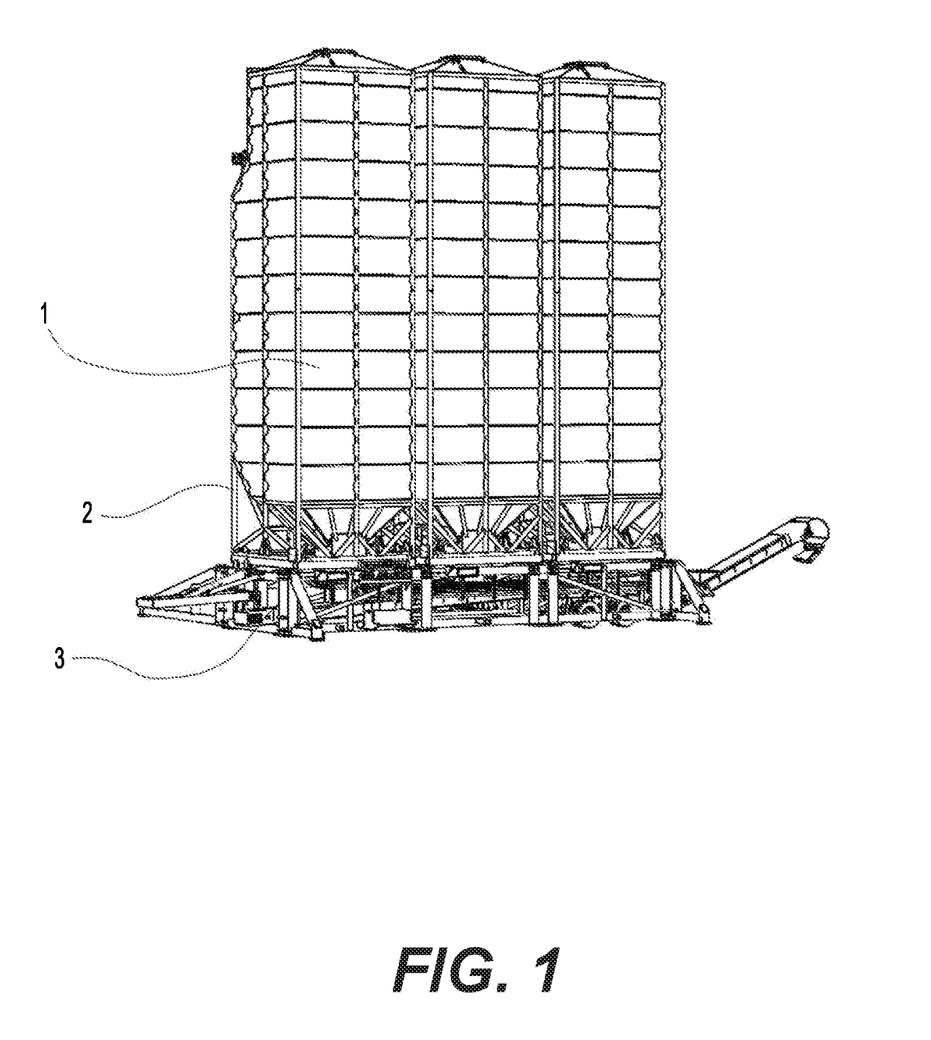
FIG. 1 is an isometric view of the invention in its preferred configuration, wherein three containers are coupled to the operations support base.
Figure 2:
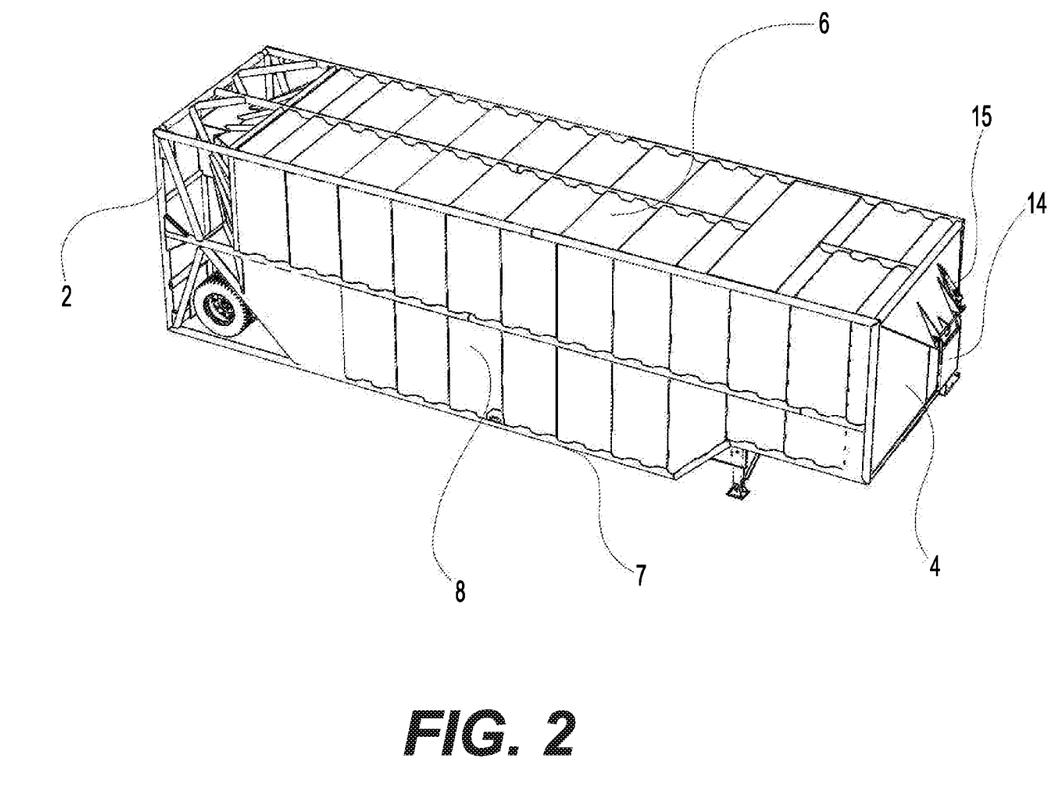
FIG. 2 is an upper isometric view of the specialized container for the storing of granulated raw materials when said container is not coupled to the operations support base.
Figure 3:
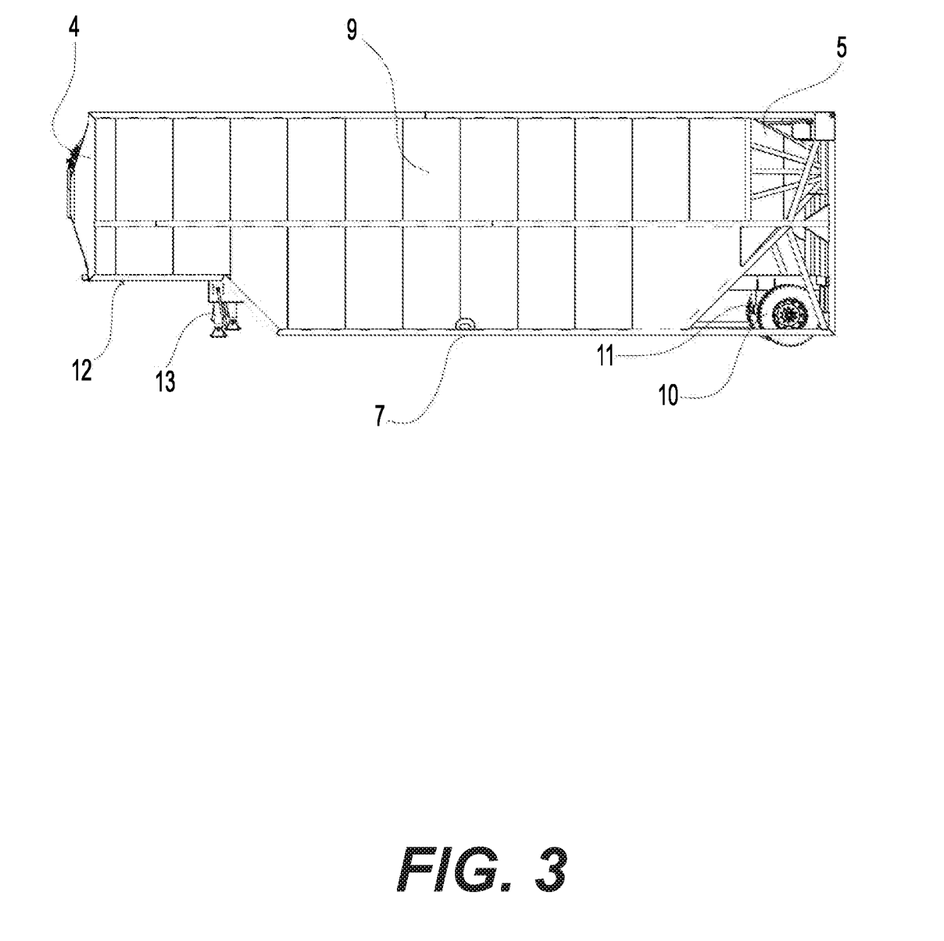
FIG. 3 is a side view of the specialized container for the storing of granulated raw materials when said container is not coupled to the operations support base.

The specialized container for the storing of granulated raw materials is a device that is made up of metallic plates or sheets, preferably made of steel, with different sizes that, taken together, resemble a rectangular prism in shape (1). This structure is fitted with support bars (2) at each of its edges, which act as a structural reinforcement. The main function of this invention is to store and supply granulated materials in a controlled fashion, fine sands being the main materials to be stored. This invention is configured preferably, though not in a limitative manner, to have a maximum storage capacity of 500,000 pounds per container. Said invention has been specially designed for operating in oil extraction fields The container's structure contemplates four larger walls and two smaller ones. It is positioned so as to have its larger and longer walls set on a vertical orientation during the invention's operation on top of a preferably metallic base (3), as is illustrated in FIG. 1, which is specially configured to dock with the container and allow for the discharge of its contents. Having this vertical configuration in mind, the structural description of the container and spatial positioning of its components, as illustrated in FIGS. 2 and 3, will be hereafter described. The invention's upper (4) and lower (5) walls are the smaller ones, while the forward (6), rear (7), right side (8) and left side (9) walls are the larger ones. The modifications and additions to these walls affect the invention's functions in its totality and are described hereinafter.

It is worth mentioning that the container must be oriented in a horizontal direction, relative to its longer walls, for its transportation, as is illustrated in FIG. 3. To this end, it is fitted with some attachments to its rear wall (7). These attachments comprise at least one wheel axle (10) and a pair of shock absorbing airbags (11) discussed in greater detail later on, which are located next to the edge of said rear wall (7) that makes contact with the lower wall (5), and a king pin (12) located at the place of the rear wall (7) that makes contact with the upper wall (4), all of which enable the container to be towed, when on a horizontal position, by an automotive vehicle. The container also has at least two support legs (13) at its rear wall (7) for when it is not coupled to a means of transportation and must hold itself on foot.

For the loading of the materials, which must be performed when the container is on a vertical position, there is a hatch (14) that is located on its upper wall (4). Said hatch is opened by means of a hydraulic jack (15) that is handled from the control zone (16) located on the base (3). This hatch allows for the precise insertion of a telescopic conveyor belt, which is not considered a part of this invention, and is connected to the container for the loading of the raw materials. The connection between the container and said telescopic conveyor belt is airtight and prevents the entrance of air during the loading process, impeding the generation of dust, thus reducing loss of materials and safeguarding said equipment's operators' health.

Figure 4:
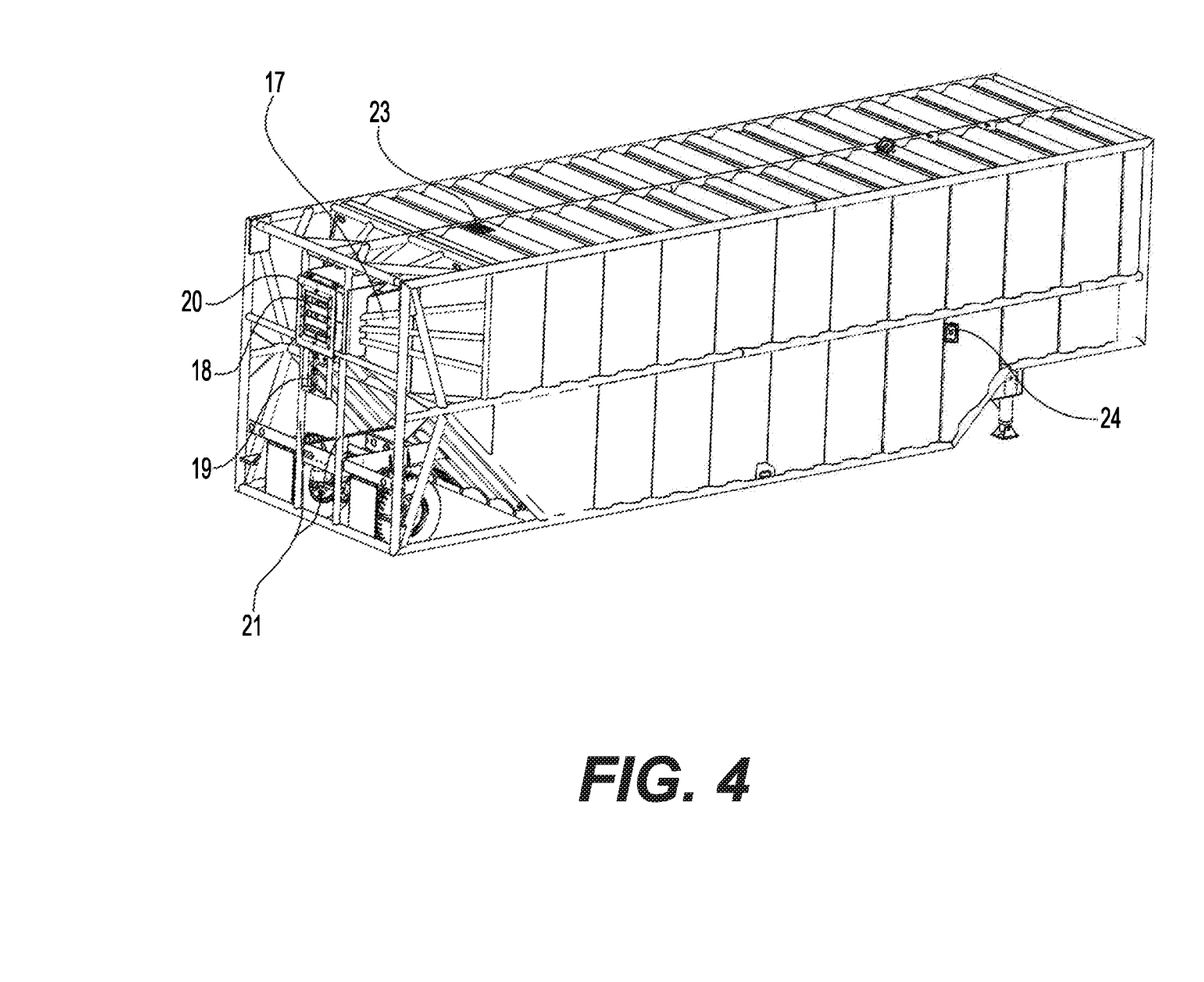
FIG. 4 is a lower isometric view of the specialized container for the storing of granulated raw materials that specially illustrates its lower wall.
Figure 5:
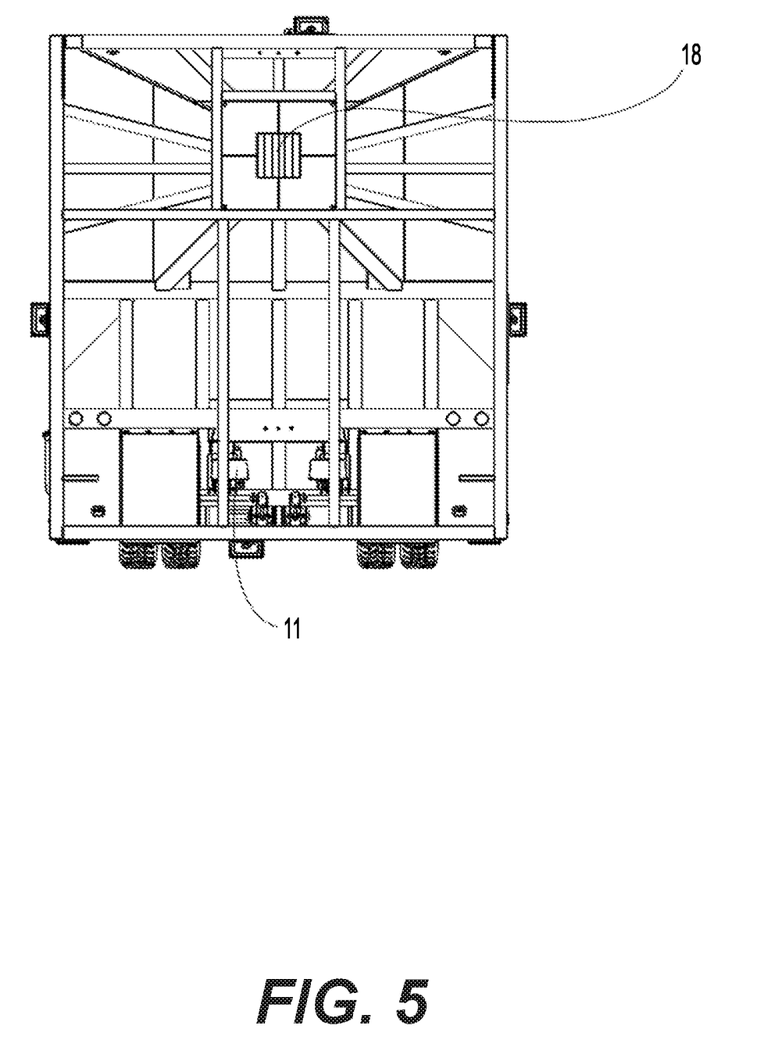
FIG. 5 is forward view of the specialized container for the storing of granulated raw materials' lower wall.

The container has an extension that resembles an asymmetric trapezoidal prism, called a chute (17), on its lower wall (5), as is illustrated in FIGS. 4 and 5. This serves to ease the drop and thus emptying of the contained materials. There is a hatch (18), located at the chute's distal end, made up of a double metallic sheet shaped as a grating that is used for material discharge. The opening and closing of the first sheet, which is the innermost of the two, can be controlled by a hydraulic jack (19) that is driven from the control zone (16) at the base (3), and said open or closed positions are regulated in accordance to the material flow speed required during the its evacuation process. The second metallic plate, located towards the chute's exterior, is fastened with metallic rivets (20) on its edges in order to prevent its movement, and is fitted with at least a pair of centered bars (21) that were designed to lessen the outflow of material during the emptying, thus facilitating the regulation of the amount of material discharge required.

Figure 6:
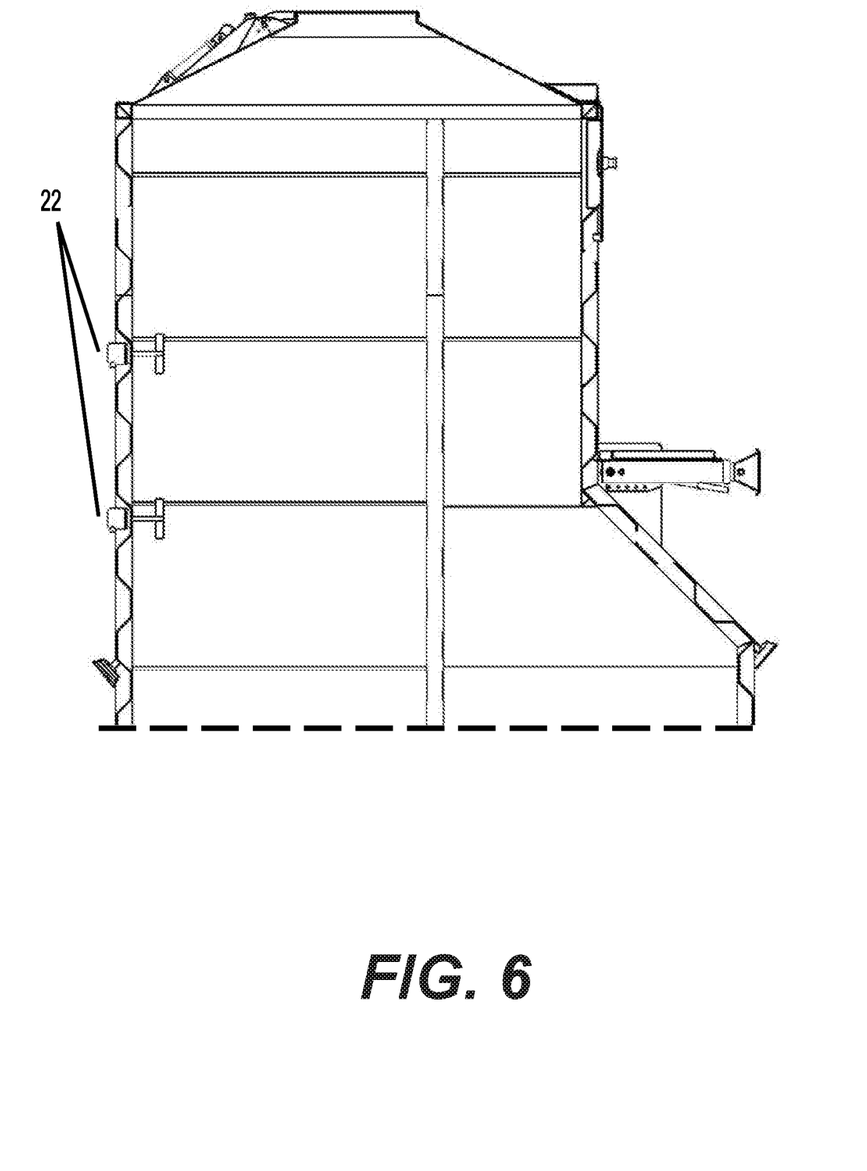
FIG. 6 is a side view of a section of the specialized container for the storing of granulated raw materials that illustrates the positioning of the granulated material sensors.

There are two sensors (22) located on the internal face of the forward wall (6), near the height of the loading hatch (14) previously mentioned, as illustrated in FIG. 6; which are two small helixes in constant rotating movement. When the granulated material reaches the sensors' height and comes into contact with the helixes, these stop their movement and send a signal to a pair of mechanisms that resemble a semaphore (23), located externally on the forward (6) and rear (7) walls at the same height, close to the base and within sight of the operators. Said semaphore mechanism has three modalities: the green light is lit when maximum capacity has not yet been reached, the amber light is lit when there is enough space left for 80,000 pounds of material, and finally, the red light is lit when the container's maximum capacity has been reached, which alerts the operator by means of a sound originated at the semaphore.

The container is fitted with a plurality of lamps (24), preferably of the 500 W LED type, on at least one of the external faces of the walls, which are turned on when the container is on a vertical orientation by means of a manual switch that regulates the energy produced by a conventional 6500 W generator. These lamps are placed near the upper (4) wall's contact zone, thus allowing the invention's use during the night or in poor light conditions.

Figure 7:
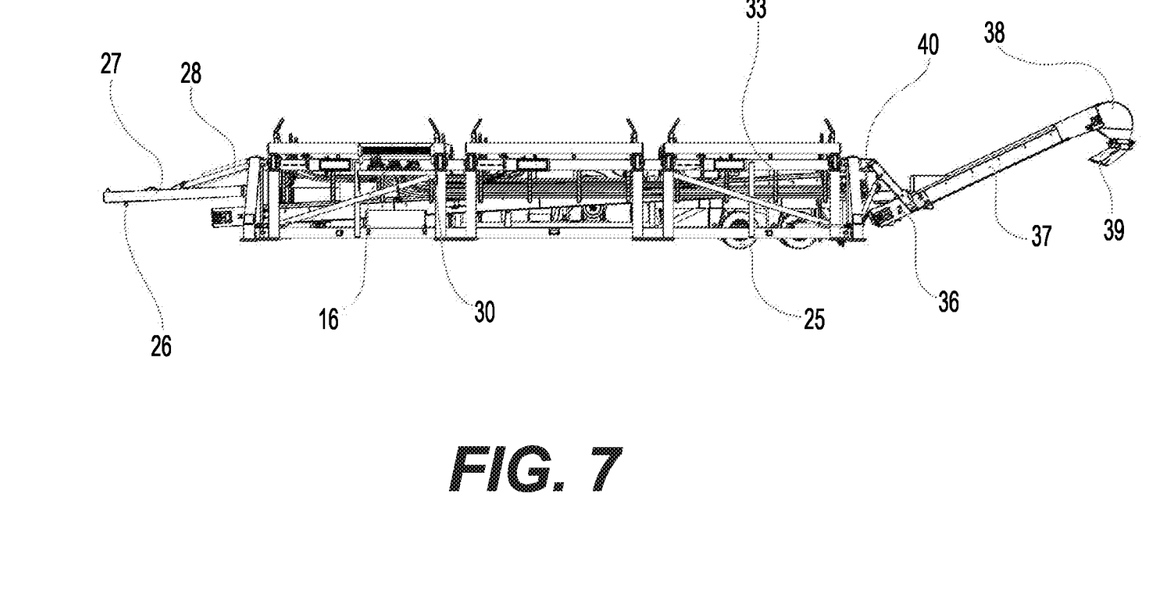
FIG. 7 is a side view of the operations support base.
Figure 8:
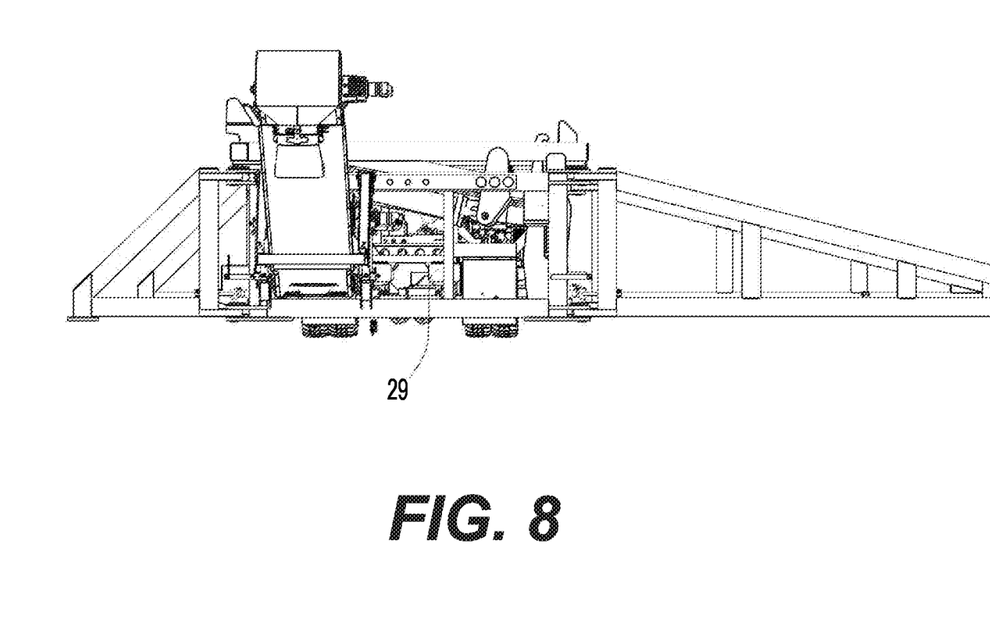
FIG. 8 is a forward view of the operations support base.

The base (3) that supports the container when it is in a vertical position is an array of steel bars that are put together into a rectangular shape, and is preferably configured to support the weight of three containers on top of it, that are independent between each other, as illustrated in FIG. 7. It is fitted with two wheel axles (25) on its forward portion and a king pin (26) located on a preferably metallic plate (27), which is capable of adjusting its position by means of an hydraulic jack (28) in order to be towed and transported. Both the base and the container are fitted between their wheel axles with a pair of shock absorbing airbags (29), as is illustrated in FIG. 8, which are similar to those on a conventional trailer box, but larger in size, which allows the base to be elevated to a greater height than a conventional trailer box in order to prevent it from suffering damage due to being transported through uneven terrain. Said airbags are activated by means of a plurality of valves (30) located near the control zone (16), that inflate them when in transportation mode and deflate them when the base is in work mode.

Figure 9:
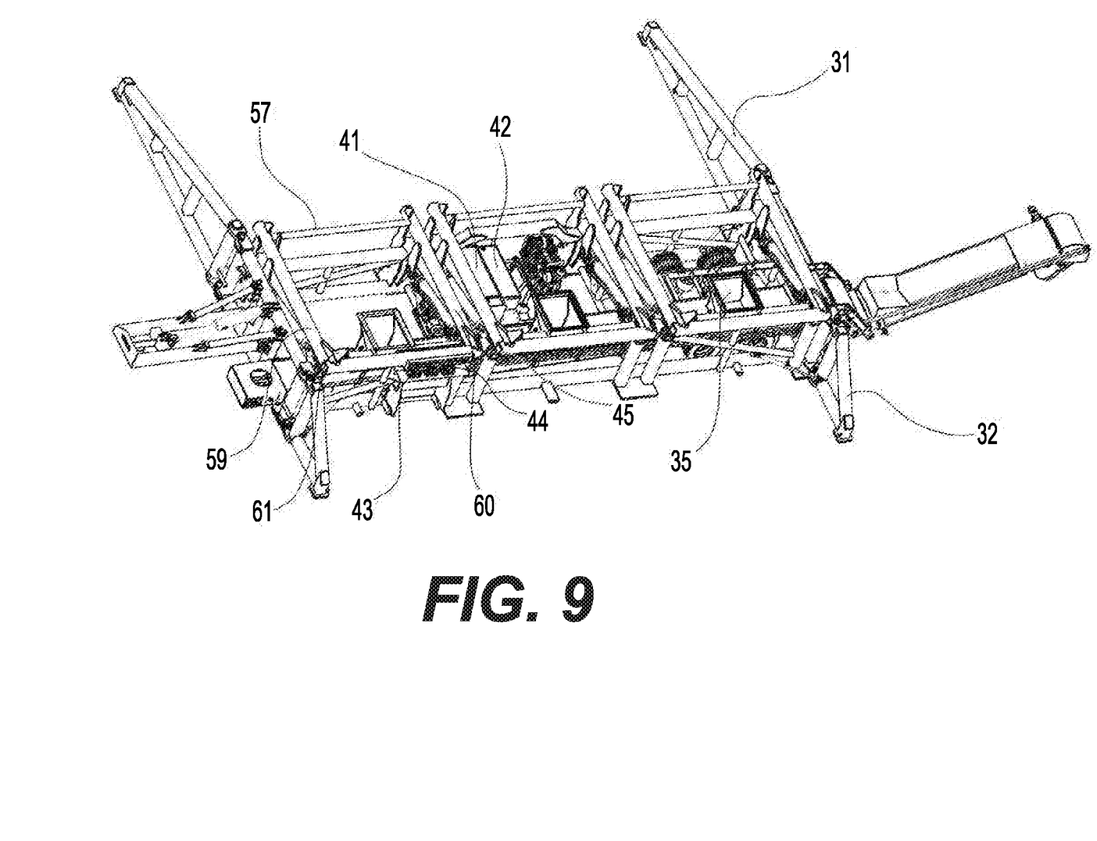
FIG. 9 is an upper isometric view of the operations support base.

This base has a plurality, preferably of four, stabilizing arms of two different sizes, having preferably two longer arms (31), as is illustrated in FIG. 9, located near one of the long faces of the base's structure and two shorter arms (32) located on the opposite face, which houses the control zone (16). These stabilizers are bent for ease of transportation and are deployed when the equipment is functioning in order to balance its total weight and prevent the containers from tilting.

Said base houses within its structure a hydraulic conveyor belt (33) that can run in a bidirectional manner, hereafter referred to as a submarine belt, which goes from the rear face of the base towards its forward face, its length overcomes that of the lateral faces of said base. This belt is covered by four metallic walls, which preferably made of thin steel that is 0.25-0.50 mm thick, in order to prevent material waste and to prevent the production of dust, and whose structure has a rectangular prism shape. Said band has three orifices (35) on its upper part, which are made in a manner so as to allow the container's discharge hatch (18) to be tightly inserted through connectors shaped as a rectangular tube so as to be able discharge the sand unto the belt. This submarine belt is connected to a pair of shorter belts also known as bridge belts (37). These are covered in a similar fashion to the submarine band (33) and have a circular opening (38) in their distal ends that has a circular shape and features a hatch (39) that slides open manually, allowing either of the bridge belts (37) to load and unload the raw materials through the front or rear parts of the base, whatever the case. It is also fitted with a plurality of hydraulic jacks, preferably two pairs, which are located on the lateral walls near the connection between belts (40) that enable the bands to move up, down, forth and backwards. The bridge belts carry the material to the point where it will be used. Located at the central part of the base (3), next to the submarine belt, there is an hydraulic engine (41) and two containers (42), for fuel and lubricant respectively, necessary to operate the invention. All of this is controlled by an operator from the control zone (16) located at the side of the base.

Figure 10:
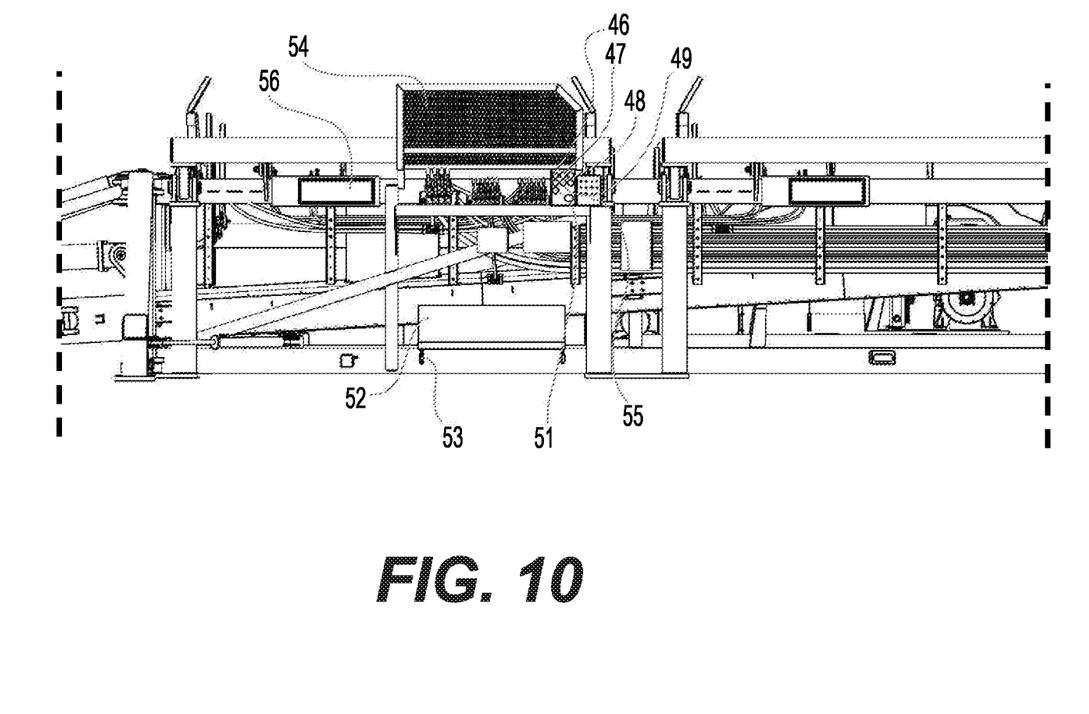
FIG. 10 is a side view of a section of the operations support base.

Said control zone (16) is located on the left side (driver's side) of the base, and has multiple levers (43) that activate each of the hydraulic jacks that are found on the base, thus controlling the motion and setup of every structure in its working position, as well as their return to their horizontal or resting position. It also features four plugs (44) that are contiguous to the aforementioned levers and allow the turning on or off of the lights, the loading siren, and the industrial scales (45), whose function is described further on. As it is illustrated in FIG. 10, this zone hosts pressure (46) and fluid (47) gauges, as well as fuel (48) and hydraulic oil (49) gauges that indicate the reserves of these substances contained within their respective deposits. The zone is fitted with an emergency button (50), whose function is to stop any process being carried out in case of any setback. It is also fitted with an accelerator button (51), in case the belt needs to be unjammed. Additionally, it has a rung (52) that allows the operator to have visibility of each container independently, and of the base in its totality. Said rung has a couple of hinges (53) that allow its manual raising when in transport mode and its descent when in working mode. There is a metallic net (54) over the control zone (16) as a means of protection in order to prevent any accident due to the proximity of the controls to one of the mobile bases. The monitoring software box (55) is located next to the control zone and is connected to each of the scales the base is fitted with, allowing the accounting of the amount of materials within each container, as well as other variables, such as, but not limited to, the loading and discharge speed and duration.

In its preferred configuration, in which it acts as a support for three independent containers, this base has a plurality, preferably of twelve, industrial scales (45) located in its internal part, four for each container. These scales are located on edges of each container's supports and are connected to an electric indicator that provides the weight of the containers content. Said indicator is located halfway between the docking site between the container and its corresponding support on the base (3) and is capable of transmitting information to an external computer in a wireless fashion.

The manner in which the container is connected to the base (3) and is placed in a vertical position is as follows: the base (3) has, in its upper face; three quadrangular frames (57) formed by metallic bars, preferably made of steel, one for each container, which are handled independently of each other from the control zone (16). Said frames have an angular motion capability that allows them to be placed in a vertical manner towards one of the side walls of the base by means of a pair of hydraulic jacks located below the frontal (59) and posterior (60) edges; meanwhile, the container is placed in reverse and oriented towards said frame, and is moved to a joining point that, when reached, the container is hooked by a pair of hooks (61) made of welded metal and located on the upper corners, having the frame in a vertical mode, of the frontal and posterior edges, initiating the angular frame's angular movement towards its horizontal again and thus allowing the container to be elevated and placed vertically into its working mode.

Having sufficiently described our invention, we consider as novel and thus claim as our exclusive property what is stated in the following clauses:

1. A base, comprising:
    a plurality of wheels;
    a coupling configured to interface with an automotive vehicle for transporting the base;
    a first conveyor belt running longitudinally along the base;
    a plurality of input orifices configured to direct granular material to the first conveyor; and
    a plurality of movable frames, each movable frame of the plurality of movable frames is configured to independently rotate:
        away from a horizontal position with the movable frame surrounding a respective one of the plurality of input orifices,
        to a vertical position,
    wherein at least two of the plurality of movable frames are configured to rotate independently in a same direction away from respective horizontal positions to respective vertical positions.

2. The base of claim 1, further comprising a plurality of support arms, each pivotably coupled to the base, wherein the support arms can be oriented in a folded-in orientation.

3. The base of claim 2, wherein the base has a transport position allowing the base to be towed by the automotive vehicle, and wherein the transport position includes the plurality of support arms being pivoted such that they are substantially parallel to a longitudinal axis of the base.

4. The base of claim 2, wherein the base has an operational position, and wherein the operational position includes the plurality of support arms being pivoted such that they are oriented substantially orthogonally to a longitudinal axis of the base.

5. The base of claim 4, wherein each of the plurality of support arms include a footing that is extendable to contact the ground when the base is in the operational position.

6. The base of claim 1, wherein each of the plurality of movable frames is rotatable at least 90 degrees.

7. The base of claim 1, further comprising a second conveyor belt positioned to receive granular material from the first conveyor belt and direct it away from the base.

8. The base of claim 7, wherein the second conveyor belt comprises:
    an enclosure to prevent granular material from escaping, and
    a nozzle for directing granular material to an intended destination.

9. The base of claim 1, further comprising at least one air-operated shock absorber capable of adjusting a ride height of the base while the base is in a transport position.

10. A method comprising:
    providing a container comprising:
        an enclosed portion comprising a plurality of rigid walls and having a front end and a rear end;
        a loading hatch disposed at the front end of the enclosed portion;
        a chute disposed at the rear end of the enclosed portion and comprising a discharge hatch;
        a plurality of wheels; and
        a coupling configured to interface with an automotive vehicle for transporting the container; and
    providing a base comprising:
        a plurality of wheels;
        a coupling configured to interface with an automotive vehicle for transporting the base;
        a first conveyor belt running longitudinally along the base;
        a plurality of input orifices configured to direct granular material to the first conveyor; and
        a plurality of movable frames, wherein each of the plurality of movable frames is associated with an input orifice of the plurality of input orifices;
    mating the container to at least one movable frame of the base; and
    elevating the container by rotating the at least one movable frame.

11. The method of claim 10, wherein mating the container to the at least one movable frame comprises rotating the at least one movable frame to a receiving position and positioning the base proximate to the at least one movable frame.

12. The method of claim 11, wherein mating the container to the at least one movable frame further comprises locking the container to the at least one movable frame.

13. The method of claim 10, wherein mating the container to the at least one movable frame comprises aligning at least one of the plurality of input orifices with the discharge hatch of the container.

14. The method of claim 10, further comprising opening the discharge hatch to receive granular material at the first conveyor belt via at least one of the plurality of input orifices.

15. The method of claim 14, further comprising transporting the granular from the first conveyor belt to a second conveyor belt of the base, the second conveyor belt positioned to receive granular material from the first conveyor belt and direct it away from the base.

* * * * *